Sept. 23, 1924.
E. W. LOTHAMER
ELECTRIC HEATER
Filed Sept. 7, 1922
1,509,561
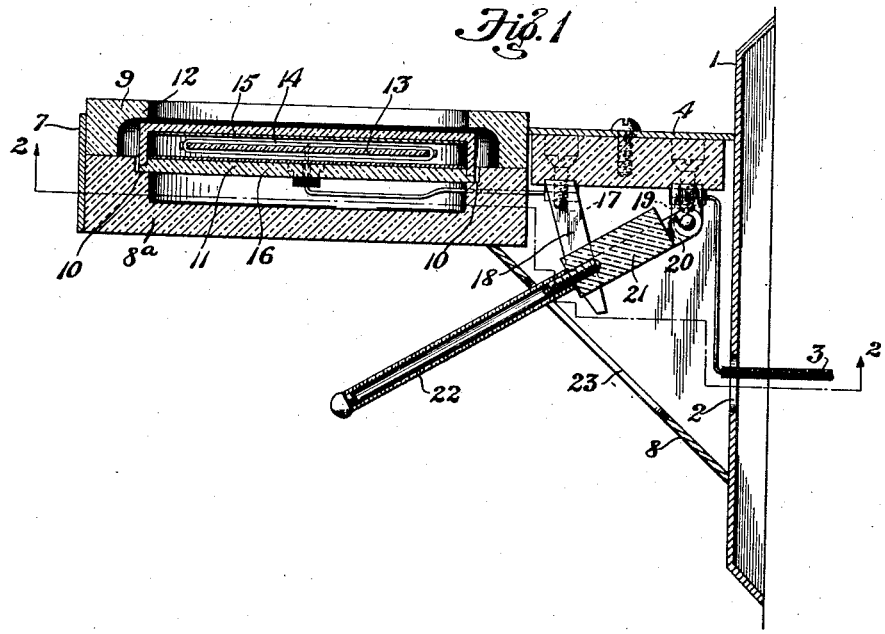
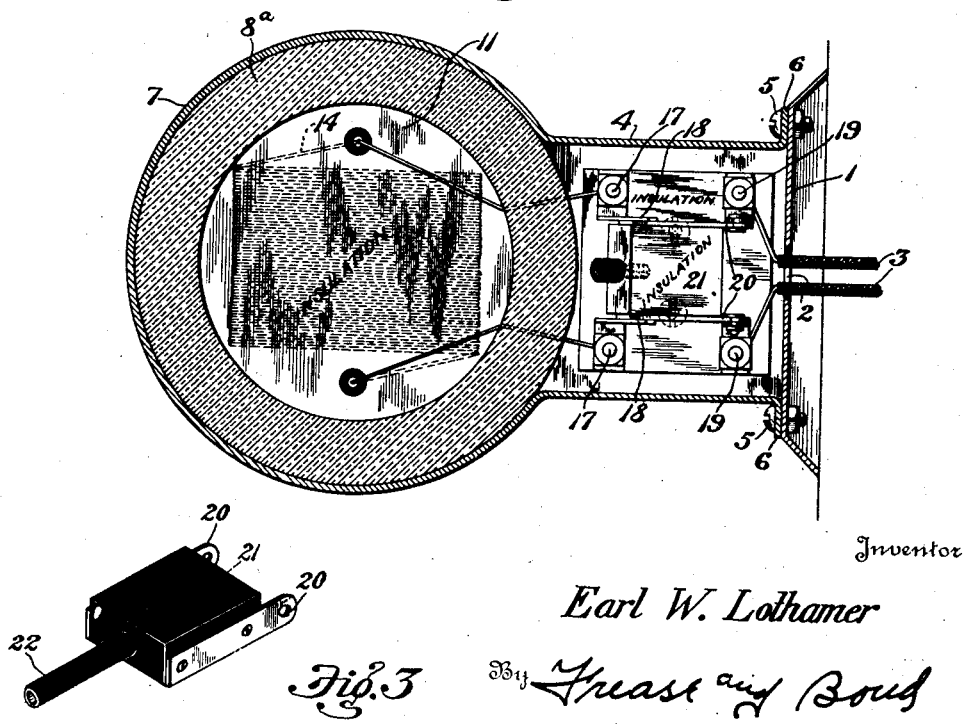
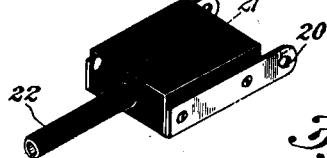
Inventor
Earl W. Lothamer
By Freast and Bond
Attorneys Patented Sept. 23, 1924.

1,509,561

UNITED STATES PATENT OFFICE.

EARL W. LOTHAMER, OF CANTON, OHIO.

ELECTRIC HEATER.

Application filed September 7, 1922. Serial No. 586,645.

*To all whom it may concern:*

Be it known that I, EARL W. LOTHAMER, a citizen of the United States, residing at Canton, in the county of Stark and State of Ohio, have invented a new and useful Electric Heater, of which the following is a specification.

This invention relates to electric heaters and more particularly to a heater comprising a permanent fixture upon the wall of a bathroom or the like, adapted to support a shaving cup or similar article to be heated.

The objects of the invention are to provide an electric heater of the character referred to which may be permanently mounted upon a wall and connected to an electric circuit, a heating element being provided in the device and arranged to be connected to the circuit by means of a manually operated switch, the device having a suitable support for a shaving cup or other article which may be placed thereon to be heated.

The above and other objects may be attained by constructing the heater as illustrated in the accompanying drawing, in which—

Figure 1 is a vertical, sectional view through an electric heater embodying the invention;

Fig. 2, a section on the line 2—2, Fig. 1; and

Fig. 3, a detail perspective view of the switch.

Similar numerals refer to similar parts throughout the drawing.

A wall plate 1 preferably formed of metal, is arranged to be connected in any suitable manner to the wall of a room and provided with an opening 2 through which the electric wires 3 may extend. A bracket 4 also preferably formed of metal is connected to the wall plate as by the bolts 5 extending through the flanged edges 6 of the bracket, the bracket being preferably provided with the rounded casing portion 7 and with the inclined supporting wall 8.

The casing in which the heating element is carried, is located within the annular portion 7 of the brass bracket and preferably comprises the circular bottom bar 8ª and the annular upper member 9, both of which may be formed of suitable insulating material.

The lower member 8ª is provided with the annular shoulder 10 which receives the insulated shell 11 containing the heating element, this shell being preferably circular as shown and extending beneath the annular flange 12 of the upper member 9, thus retaining the heating element within the casing 8ª—9.

The heating element comprises a plate 13 preferably of micanite around which is coiled suitable resistance wire 14, No. 29 comet resistance wire having been found suitable for the purpose. Plates 15 and 16 of micanite or other suitable material are located within the shell 11 upon the upper and lower inner sides thereof.

Opposite ends of the wire 14 are extended downward through the shell 11 and backward through the lower casing member 8ª, being connected to the binding posts 17 to which are attached the contacts 18 of the switch. The wires 3 from the house circuit are connected to the binding posts 19 to which the double pole switch blades 20 are pivoted, said blades being fixed upon opposite sides of an insulated block 21 and arranged to be moved into engagement with the contacts 18, a handle 22 being fixed upon the block for operating the same and extending through the slot 23 in the plate 8 of the bracket.

The operation of the device will be apparent from the drawings and the above description. The casing 8ª—9 forms a suitable support for the shaving cup or other article to be heated and the heating element may be instantly operated by throwing the switch blades 20 into contact with contacts 18, completing the circuit from the house wires 3 through the resistance wire of the heating element.

It will be noted that the resistance element is entirely insulated from the support and bracket and the switch is enclosed, the handle only protruding through the slot in the bracket, permitting the same to be easily operated, without danger of the user coming into contact with any conducting portion of the device.

I claim:—

1. An electric heater including a bracket adapted to be permanently secured to a wall, an insulated housing carried upon the bracket, a heating element enclosed within said housing, an electric circuit connected to the heating element and a switch in said circuit carried by the bracket.

2. An electric heater including a wall plate, a bracket fixed thereto, a housing carried by the bracket and arranged to support an article to be heated, an insulated shell within the housing, a heating element enclosed within the shell, an electric circuit connected to the heating element, and a switch in the circuit mounted upon the bracket.

3. An electric heater including a wall plate, a bracket fixed thereto, a housing comprising a shouldered bottom piece and a flanged top piece, an insulated shell supported at its edges between said top and bottom pieces, a heating element enclosed within said shell, an electric circuit connected to the heating element and a switch in the circuit mounted upon said bracket.

EARL W. LOTHAMER.